UNITED STATES PATENT OFFICE.

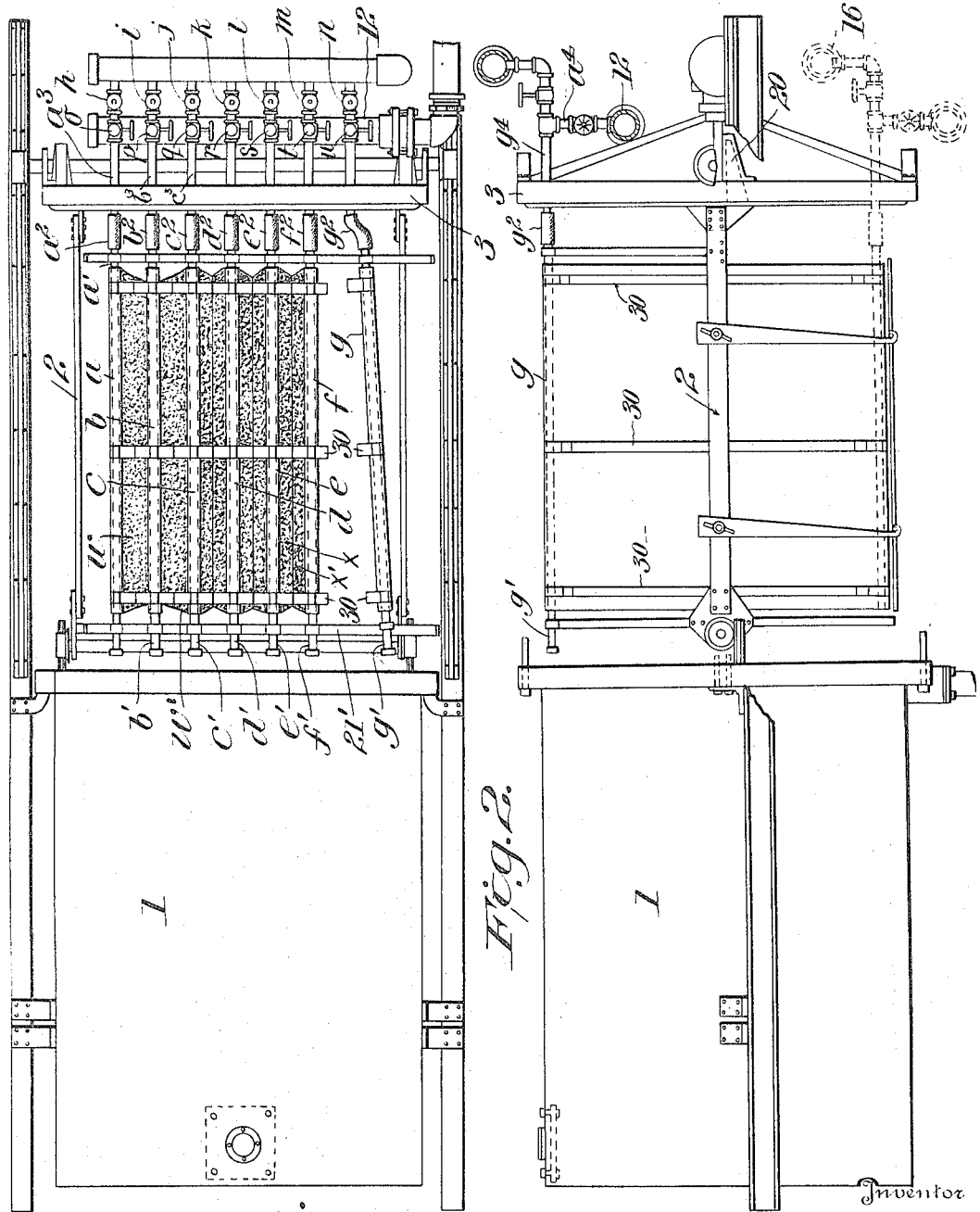

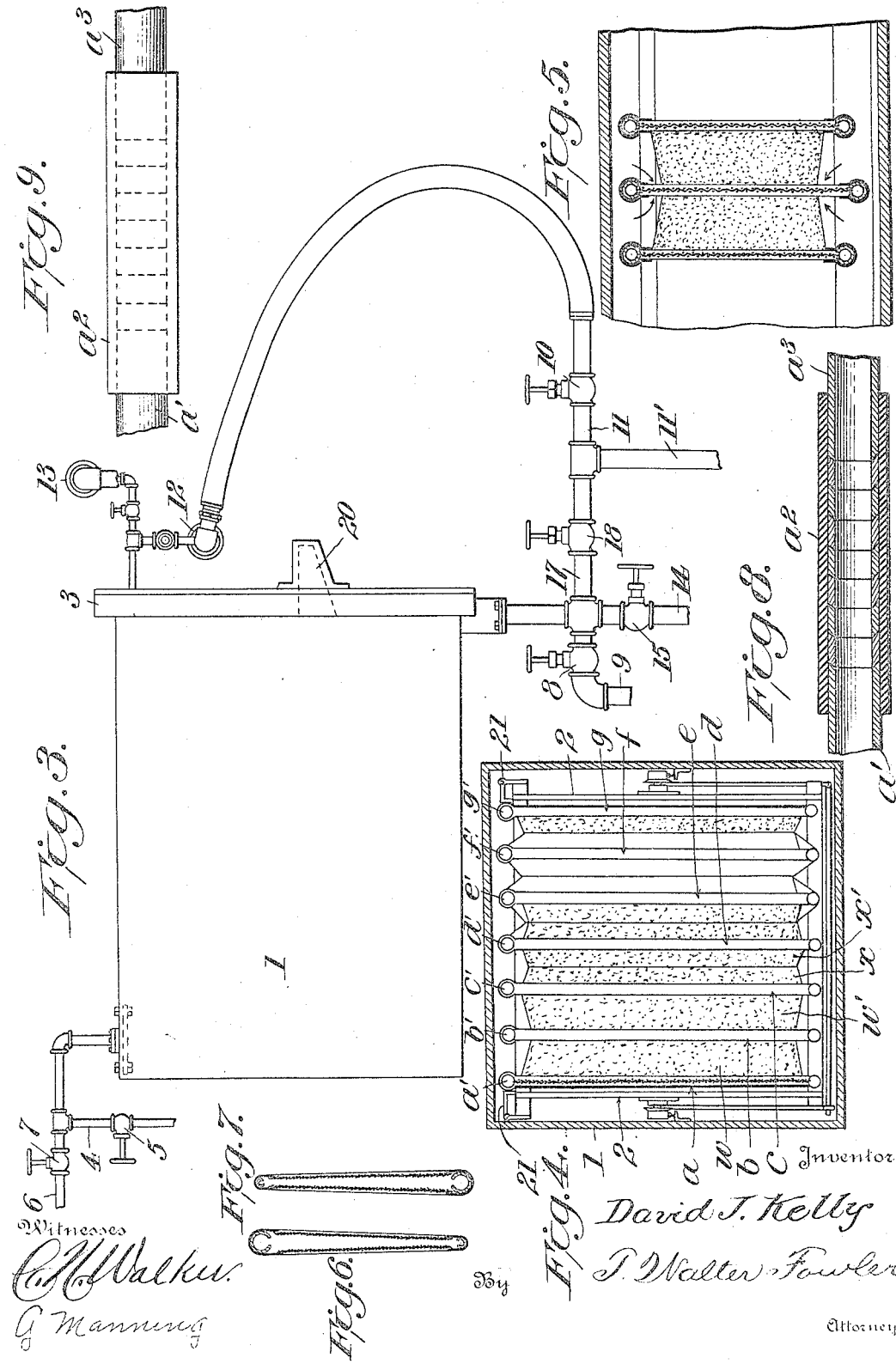

DAVID J. KELLY, OF SALT LAKE CITY, UTAH, ASSIGNOR TO KELLY FILTER PRESS COMPANY, OF SALT LAKE CITY, UTAH, A CORPORATION OF UTAH.

FILTERING PROCESS.

1,158,055.   Specification of Letters Patent.   Patented Oct. 26, 1915.

Application filed October 22, 1913. Serial No. 796,661.

*To all whom it may concern:*

Be it known that I, DAVID J. KELLY, a citizen of the United States, residing at Salt Lake City, in the county of Salt Lake and State of Utah, have invented certain new and useful Improvements in Filtering Processes, of which the following is a specification.

My invention relates to a new and useful filtering process designed to separate liquids from solids, and the invention consists of the process and the steps thereof substantially as I will hereinafter describe and claim.
In the accompanying drawings I illustrate one type of apparatus which will be found useful in working the several steps of my process but it will be understood that the invention is not restricted thereto or to any particular type of apparatus so long as the various steps of my process and the results following from the operations of these steps are carried out.

In said drawings, forming part of this specification, and in which similar reference characters indicate the same parts in the several views;—Figure 1 is a plan view of a tank showing a carrier with its attached filter frames removed from the tank. Fig. 2 is a side elevation of Fig. 1. Fig. 3 is a side elevation of the tank with its associated pipe connections, the filter carrier being contained within the tank. Fig. 4 is a cross-section of the tank and its contained filter carrier. Fig. 5 is an enlarged sectional detail to be hereinafter referred to. Fig. 6 is an enlarged cross-section of a filter frame embodying my invention and tapering in a downward direction. Fig. 7 is a similar view of a filter frame tapering in an upwardly direction. Fig. 8 is a sectional view of the flexible joint between the filter frame and the corresponding pipe connection. Fig. 9 is a side elevation of the same.
As before stated, the present invention is adapted to the separation of liquids from solids; more particularly it is designed in the metallurgical art for the filtration of mineral bearing slimes, although it will be found useful in other fields of industry—as the filtration of sugar solutions, and of chemicals—and, in fact, where the desideratum is to separate the liquid portion of a pulp or material from the solid constituents thereof.

A leading object of the present invention is to make what is termed "dry cakes"; that is, cakes formed of the solid constituents of the pulp or material operated on and containing a low percentage of moisture.

It is well known that in closed-tank filters—say of the type described and claimed in my former Patent Number 815,021, dated May 13, 1906, the general operation may be briefly said to be in building on the filter frames, or elements, within the tank, cakes to a thickness so that the cakes on adjacent filtering frames, or elements, do not meet. This is done for the principal reason that the space usually left between the opposed surfaces of adjacent cakes, facilitates the step of impoverishing the cakes of their contained values by the application of a subsequent wash after the cakes have been built on the open filters, or elements. A further reason for leaving a space between the opposed surfaces of adjacent cakes is, to provide for the discharge of the cakes; that is, to afford room to permit the cakes to detach or be detached from the sides of the filter frames, or elements.

The solid cake, that is, the cake which extends continuously, and in more or less compact form from the side of one filter frame, or element to the opposed side of the adjacent filter frame, or element, and built between adjacent elements, contains a lower percentage of moisture than the cakes built upon an open-leaf filtering element with a space between the opposed surfaces of the cakes, because in the latter case, where each cake is built to one filter surface only, the outer surfaces of adjacent cakes are subjected to the action of the liquid in said space and are soft and contain a high percentage of moisture.

The present process aims to build a solid cake such as has been referred to; to provide a novel step of washing such cakes for the purpose of extracting therefrom any of the contained values, and a novel manner of discharging the cake. Heretofore, as far as I am advised, the practice has been not to build solid cakes because such cakes cannot be washed nor discharged in the usual manner in filters of the type before referred to.

In carrying out my process, the filter elements may follow the general lines of the so-called open-leaf filters, but I aim to facilitate the discharge of the solid cakes and one way in which I accomplish this is to shift the filtering elements in a sidewise direction i. e. laterally from the cake and away from the side thereof whereby the space between adjacent filter elements is thus increased beyond the thickness of the cake and ample room is provided to allow for the discharge of said cake. Thus as distinguishing from filter frames, or elements, which are more or less rigidly attached to the tank in which they are contained, I prefer to mount the filter frames, or elements, so as to make them capable of being moved sidewise or transversely to the side of the cake. This step, however, is subordinate to the building and washing of the cake and it may or may not be employed, according to conditions. For instance, some solid materials, after washing, and subsequent air-blowing contract to a sufficient degree to drop readily without shifting the filter frames, or elements.

In order that the several steps and functions of my process may be better understood I will now explain the same in connection with the apparatus which I have shown for illustrative purposes, and which apparatus is not claimed herein, since it forms the subject-matter of another application which I have filed of even date herewith.

In said drawings the tank, 1, may be of any suitable construction, design, and capacity and, preferably, it is open at one end only and this end is designed to be tightly closed during the building and washing of the cake by a locking head, 3, of any appropriate character. This locking head may be fixed to and movable with a filter carrier, 2, of suitable construction arranged to slide in and out of the tank on suitable ways or tracks provided for the purpose, in much the same way disclosed in my former patent referred to. However, the character and construction of the carrier and the direction and manner in which it is placed in and removed from the tank are unimportant, although the arrangement of the tank and filter carrier shown will be found quite effective in the working of my process.

The tank is designed to be filled with slimes-pulp or the other material to be treated and which is forced into the tank under pressure derived from any suitable source. As the material fills the tank it displaces the contained air and provision for the escape of this air is made through a pipe, 4, having a valve, 5, which is designed to be closed when the tank is completely filled.

The filter carrier is supplied with appropriate filter frames, or elements, $a, b, c, d, e, f$ and $g$, of which there may be any desired number. The construction of these elements may also vary. If the elements are of the so-called open-leaf type, they may include a woven wire or other foraminous, or corrugated, plate contained between and reinforcing the filter sides and which sides may be composed of a suitable fabric capable of filtering the material by permitting the fluid portion to pass therethrough, and of sustaining the weight of the cake built on said sides.

The interior of each of the filter frames, or elements, is, therefore, hollow and communicates with a pipe at either or both ends and which pipe readily permits the fluid which has passed through the filter sides to be conducted to the outside of the tank substantially as disclosed in my aforesaid prior patent, it being understood that as soon as the tank is completely filled with material under pressure, the pressure begins to act to cause a flow of liquid through the sides of the filter, and to cause the solids to be arrested and to accumulate as a deposit on the outer surfaces of said sides. Filtration is continued until the flow of liquid from the filtering elements practically ceases. Some materials filter more freely than others, and accordingly I make the space between the individual filtering elements of a sufficient width to suit the conditions of the material to be treated; that is, with a free filtering pulp I may have a wider space than with a pulp which gives high resistance to filtration. I, therefore, make the spacing of such a width as to insure obtaining a solid cake in the spaces between the opposed surfaces of adjacent filter frames, or elements in an economical time limit.

Each of the filter frames, or elements, $a, b, c, d$ etc., is provided with a suitable outlet pipe or conduit, $a', b', c'$, etc., for the filtered liquid and in order that the filter frames, or elements, may be moved sidewise away from the cake when formed, as before explained, I provide some form of flexible joint, $a^2, b^2, c^2$, etc., Figs. 1, 8 and 9, at one end of the pipes or conduits, $a', b', c'$, etc., said flexible connection being in turn coupled or attached to corresponding pipes, $a^3, b^3, c^3$, etc., fixed in the head of the carrier, and said last pipes having suitable valves, $h, i, j, k, l, m$ and $n$, connecting with a manifold 13. The pipes or conduits from each of the filter frames, or elements, likewise connect with branches, $a^4, b^4, c^4$ etc., having controlling valves, $o, p, q, r, s, t$ and $u$, and said branches in turn connect with a manifold, 12, as shown in Fig. 3.

Connecting with the top of the tank is a pipe, 6, having a controlling valve, 7, and leading from the bottom of the tank is a pipe, 14, having a controlling valve, 15. In the pipe, 14, is a coupling member from which branches a pipe, 9, having a controlling valve, 8, and also connecting with the coupling member is a pipe, 11, having a branch, 11', and controlling valves, 10 and 18, one at each side thereof, said pipe, 11, being in turn connected to the manifold, 12, as shown in Fig. 3.

In the present drawings I have shown the conductors, a' b', c', etc., for the filtered liquids as being at the top of the filter frames, or elements, but it is quite apparent that filtered liquid can be taken off from the bottom of the filter frames, or elements, as shown by dotted lines, 16, in Fig. 2, which arrangement has the additional advantage of completely draining the space between the filter cloths of each filter frame, or element. Accordingly, it is within the range of my process to conduct the filtered liquid from either the upper or lower portion of the filter frames, or elements.

When the solid cakes are formed, in the manner before described, I then drain the excess unfiltered material from the tank, 1, by admitting compressed air through the valve-controlled pipe, 6, and at the same time, I open the valve, 8, controlling the branch pipe, 9, attached to the lower portion of the tank. The withdrawal of the excess unfiltered material may or may not be essential, according to the degree of wash desired, it being understood that the unfiltered material surrounding the filter frames, or elements, does not enter them as the flow before stated has been practically stopped through the building of a solid cake. If the surplus unfiltered material is withdrawn the next step is to fill the tank with a wash solution which is allowed to enter the tank under pressure through the pipe line 11', and 17, controlled by the valve, 18, the air displaced during this filling of the tank with the wash solution passing out through the pipe, 4, as in the case of the filling of the tank with slimes. When the tank is completely filled with the wash solution, the valve, 5, controlling the pipe, 4, is closed, and the wash solution under pressure completely surrounds the filter frames or elements with their attached cakes, but cannot enter the frames or elements as in the case where the cakes are not built solid but with a space intervening between the opposed sides of adjoining cakes.

In order to effect the necessary washing of the solid cake, I open the valve, 10, in the pipe, 11, leading to the manifold, 12, and to which manifold are connected the valve-controlled outlets from the individual filter frames, or elements, as before described, and I close the valves, o, q, s and u, it being apparent that these are the valves in alternate pipes. At the same time I close the valves, i, k, m, controlling the alternate branch connections leading to the filter frames, or elements, b, d and f. This manipulation of the valves in these several pipe connections permits the wash solution to enter the interior of the filter frames, or elements, b, d and f, through the valves, p, r and t, which are left open, and which control the pipes which are intermediate of those controlled by the valves, o, q, s and u, which are closed. Because of this arrangement the wash solution is distributed throughout the entire interior of the filter frames, or elements, b, d and f, the valves, h, j, l and n on the alternate series of filter frames or elements, a, c, e, g, being left open. It thus becomes obvious that the wash solution, under pressure, in order to find an exit must pass through the solid cakes following the direction of the arrows in Fig. 1 and in doing this it displaces the values therefrom and which remain after the first expression of the liquor or after the cake-building operation. The washing function is continued to any desired point, after which the valve, 18, in the pipe, 17, and controlling the flow of the wash solution to the tank, should be closed and also the valve, 10, in the pipe, 11, leading to the manifold, 12. The tank is now drained in the same manner as with the slimes pulp. If the wash solution is applied without draining the excess unfiltered material after the cake-building operation, then the cakes may be washed without the withdrawal of this excess unfiltered material, the operation being the same as before described, with the exception of the withdrawal of the excess material and the filling of the tank with the wash solution.

If it is desired to air-blow the cakes to further reduce the moisture which they contain, this may be accomplished by permitting air under pressure to enter through the same channels, as were used for conducting the wash solution to the filter frame; that is, compressed air is permitted to enter the tank, 1, through the valve, 18, and also through the valve, 10, controlling the pipe, 11, connected with the manifold, 12. The compressed air remaining in the tank, 1, may be withdrawn by opening the valve, 5, controlling the pipe, 4.

The apparatus can now be opened for the discharge of the cakes. This may be done by unlocking the head, 3, of the carrier, 2, from the tank, by means of some quick-head-locking mechanism, which is well known in this art, and withdrawing the carrier from the tank. The manner of withdrawing is unimportant and for this purpose I may depend upon gravity as described in my aforesaid Patent Number 815,021, or I may employ any suitable mechanical means which will cause the carrier to emerge from the tank or permit it to be removed to a point outside of said tank. When the carrier has been completely withdrawn from the tank, the cakes may be quickly dropped by pulling or forcing the filter frames, or elements, sidewise, as shown in Fig. 1, the flexible joint, $a^2$, $b^2$ and $c^2$ etc. between these frames, or elements, and the pipe connections, $a^3$, $b^3$ and $c^3$, etc., readily permitting of this movement. After the cakes have been discharged, the filter frames, or elements, are returned to their original position, the carrier, 2, is returned to the tank, and clamped in place, and the apparatus is again ready for another cycle of operations.

I have described one method by which I can wash solid cakes in a filter of the open-leaf type. It will be noted that if all of the filter frames, or elements, are allowed to express liquid that the solid cakes, which eventually form between the sides of adjacent frames, or elements, consists substantially of two cakes, the outer faces of which eventually meet to form one solid cake. This is the method of cake building employed in the well known plate and frame type of filter presses, but I have no knowledge of such a method ever having been used in a filtering apparatus of the open-leaf type and accordingly I believe that I am the first to employ the method described of washing cakes in a filter of the open-leaf type, without regard to the particular character of the mechanism employed for the purpose.

If it is found undesirable to build cakes on all of the filter frames, or elements, which cakes will eventually meet to form solid cakes, as represented by $x-x'$, I cut off alternate filter frames, or elements, and prevent any outflow of the liquid from the same, in which case a cake will form on the remaining filter frames, or elements, the outlets of which are allowed to remain open. The cakes forming on these latter filter frames, or elements, will eventually build sufficiently to form a solid cake in the space between their exterior surfaces and the adjacent filter frames, or elements. It is quite obvious that if the wash solution is forced through the filter frames, or elements, which have been closed during the filtering operation, that the wash will pass through the cakes on adjacent frames in the same direction as the filtered liquid passed during the filtering operation, as with cakes, $w-w'$, of Fig. 1. The method of cake washing may also be somewhat modified. For instance, in Fig. 5, the series of alternate filter frames, or elements, not used for cake building can be made in a manner such that their outer edges will project into the wash solution, as it enters the submerging tank. This provides a means for the wash solution to enter the interior of those filter frames, or elements, without conveying the solutions through the outside manifold as described.

If the cake shows any tendency to drop from the filter frames, or elements, after the pressure has been relaxed, I may overcome this by tapering the filter frames, or elements, Fig. 7, so as to form a space between adjacent frames smaller at the bottom than at the top; or a pipe may be employed at the bottom of the filter frames, or elements, which has a larger diameter than the body of the filter frame, as shown in Fig. 4. In this manner it is quite clear that a constricted opening may be formed in the lower part of the space between adjacent filter frames, or elements, and that because of the space being narrower at the bottom, the cake formed in such space will not drop from its position before the carrier is withdrawn from the tank.

In some cases the cakes hang to the filter frames with greater tenacity than in others and when this occurs I prefer to use a wider opening at the bottom between adjacent frames and employ frames tapering downwardly. I may, also, if desired, employ a hinged door, which can be placed immediately below the filter frames, or elements, and out of contact with the tank, said door being mounted on the filter carrier and adapted to be opened when the carrier is withdrawn.

In some cases the cakes may be discharged by forcing air or some other fluid to the interior of the filter frames, or elements, which causes the flexible sides of the frames to inflate or bulge outwardly, crowding the sides apart to a degree sufficient to allow the cake to detach and drop freely by gravity.

Heretofore I have described a flexible connection at one end of the filter frames, or elements, to provide for a side movement of said frames, to facilitate the discharge of the formed cake. In many cases, however, it is not necessary to move the front end of the filter frames, or elements, as a sufficient space for freely dislodging the cakes may be obtained by simply giving an outward side movement to the filter frames, or elements, at the back.

If a clogging tendency of the fabric sides of the filter frames, or elements, is evidenced, by virtue of the slimes particles becoming embedded in the pores of the fabric, then I prefer to force the wash solution to the interiors of the filter frames, which have not been used for this purpose for a cycle or more of operations. This reverse current has a cleansing effect. It is obvious that the alternate filter frames which have been used to convey the wash solution to the cakes may be used for cake building during any other cycle.

The exterior of the group of filter frames, or elements, say those indicated by reference characters, $a$ and $g$, are intended to form a cake only on the inner side, and I make provision to place an impervious medium on the outside thereof, to prevent the formation of the cake on this side. This may be accomplished by using oilcloth, or sheet metal, or any other impervious medium suitable for the requirements. I also prefer to use an impervious medium along the upper and lower edges of the filter frames to prevent the cake from forming along these edges, as a cake which would so form on the lower edge would have a greater tendency to drop than that portion of the cake which is built up on the main portion or body of the filter element. The cake forming over the top edge of the filter frame cannot be readily discharged.

I have also observed that if the filter frames, or elements, are more or less flexible, when the solid cakes begin to form and the spaces are unequal, the narrower spaces will fill first and the tendency is for the filter frames to be pushed together more or less on account of the balance of pressure on their opposite sides being destroyed. To overcome this, I have provided means to prevent the filter frames becoming forced together in the manner stated, thereby eliminating the forming of unequal cake thicknesses and also providing a means for holding the frames at equal distances apart. The desired object may be obtained by means of fillers or spacers, 30, attached to the filter-frames, or elements, and which prevent any side movement of these parts during filtration or cake-building.

To prevent spreading of the filter frame during the filtration and wash period I provide a hinged rod, 21, which may be thrown over into contact with a supporting plate, 21', in such a manner that the ends come into contact with the outer filter frames, or elements, and prevent their spreading. In Fig. 3 I have shown a recess, 20, in the head of the filter carrier adapted to accommodate the projecting ends of the rails, which extend beyond the front end of the tank. The projection of these rails provides a greater end movement of the filter frame carrier than if the rails extended only flush with the front end of the tank and the additional forward movement thus provided for permits the carrier to emerge far enough to allow the back ends of the filter frames to emerge from the tank. In this manner the operation of the side movement before described, is facilitated.

Having thus described my invention what I claim as new and desire to secure by Letters Patent is:—

1. The process substantially as herein described of washing cakes built solid in the spaces between adjacent filtering elements of the open-leaf type, said process consisting in surrounding the filtering elements and their attached cakes with a fluid under pressure and while the cakes are thus subjected to pressure conveying a washing fluid to the interior of alternating filtering elements and at the same time drawing off the displaced liquid from the cakes through filtering elements which are intermediate of the first-named elements.

2. The process substantially as herein described of discharging solid cakes from filters of the vertical open-leaf type, said process consisting in laterally shifting the filtering elements to a sufficient degree to provide a space between adjacent filtering elements wider than the thickness of the formed cakes.

3. The process substantially as herein described of discharging solid cakes from filters of the vertical open-leaf type, said process consisting in providing a cake-forming space between adjacent filtering elements which is wider at the bottom than at the top and applying fluid pressure to the interior of filtering elements to break the contact of the solid cake with the outer sides of the filtering medium.

4. The process substantially as herein described of holding solid cakes in place between adjacent filtering elements in filters of the open-leaf type, said process consisting in contracting the space between the lower portions of adjacent filtering elements to prevent the cakes from dropping when pressure is released.

5. The process substantially as herein described of uniformly washing solid cakes in filters having a series of filtering elements arranged side by side and spaced apart to permit of solid cakes forming therebetween, said process consisting in building cakes on alternating filtering elements so that the outer faces of the cakes contact with adjacent filtering elements which alternate with the first-named elements; conveying a washing liquid under pressure to the interior of the filtering elements not in operation during the cake building, and thence through the solid cake in the same direction as the flow of the filtrate during the cake building operation; and conveying the liquid displaced from the cakes from the interior of the filtering elements on which the cakes were built.

6. The process substantially as herein described of treating slimes and the like in filters of the open-leaf type, said process consisting, essentially, in building solid cakes in the spaces between adjacent filtering elements; surrounding the cakes with fluid under pressure displacing the values from the solid cakes by a washing operation; and discharging the solid cakes by the spreading apart of the filtering elements in relation to one another.

7. The process herein described of treating slimes and the like in a filter of the open-leaf type, said process consisting in building solid compact cakes in the spaces between adjacent filtering elements; exposing the filtering elements and attached cakes to external pressure; and while the cakes are under external pressure introducing a wash solution to the inside of alternating filtering elements while drawing off the displaced liquid through the elements which alternate with the first named elements.

8. The process herein described, of treating slimes in filters of the open-leaf type, said process consisting in building solid cakes in the spaces between adjacent filtering elements; displacing the values from the cakes by exposing said cakes to an external pressure; and while the cakes are thus subjected to the external pressure conveying a wash solution to the interior of alternating filtering elements, thence through the solid cakes and thence out of the series of filtering elements which alternate with the first named elements and which have a superior pressure upon their exterior sides.

In testimony whereof I affix my signature in presence of two witnesses.

DAVID J. KELLY.

Witnesses:
  C. B. FELT,
  G. F. SUMMERS.